(12) United States Patent
Kibble

(10) Patent No.: US 9,083,428 B2
(45) Date of Patent: Jul. 14, 2015

(54) CONTROL DEVICE

(75) Inventor: David Kibble, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 2393 days.

(21) Appl. No.: 11/825,852

(22) Filed: Jul. 9, 2007

(65) Prior Publication Data

US 2008/0231760 A1 Sep. 25, 2008

(30) Foreign Application Priority Data

Jul. 12, 2006 (EP) .................................... 06253643

(51) Int. Cl.
| | |
|---|---|
| *H04B 1/20* | (2006.01) |
| *G06F 3/03* | (2006.01) |
| *G06F 3/0346* | (2013.01) |
| *G08C 17/02* | (2006.01) |
| *H04N 5/44* | (2011.01) |
| *H04N 5/445* | (2011.01) |
| *H04N 21/422* | (2011.01) |

(52) U.S. Cl.
CPC .............. *H04B 1/202* (2013.01); *G06F 3/0325* (2013.01); *G06F 3/0346* (2013.01); *G08C 17/02* (2013.01); *H04N 5/4403* (2013.01); *H04N 5/44582* (2013.01); *H04N 21/42222* (2013.01); *H04N 2005/4428* (2013.01); *H04N 2005/4432* (2013.01)

(58) Field of Classification Search
USPC ........................... 348/734, 553–555, 725, 552
See application file for complete search history.

(56) References Cited

U.S. PATENT DOCUMENTS

| | | | |
|---|---|---|---|
| 5,572,251 A | 11/1996 | Ogawa | |
| 5,594,468 A | 1/1997 | Marshall et al. | |
| 7,134,078 B2 * | 11/2006 | Vaarala .......................... | 715/730 |
| 7,420,540 B2 * | 9/2008 | Olbrich .......................... | 345/158 |
| 7,683,881 B2 * | 3/2010 | Sun et al. ....................... | 345/156 |
| 7,760,907 B2 * | 7/2010 | Haughawout et al. ......... | 382/100 |
| 2003/0007104 A1 | 1/2003 | Hoshino et al. | |
| 2006/0125968 A1 * | 6/2006 | Yokozawa et al. ............. | 348/734 |

FOREIGN PATENT DOCUMENTS

| | | |
|---|---|---|
| JP | 2005021458 | 1/2005 |
| WO | WO 2007/003682 A1 | 1/2007 |

* cited by examiner

*Primary Examiner* — Trang U Tran
(74) *Attorney, Agent, or Firm* — Allen, Dyer, Doppelt, Milbrath & Gilchrist, P.A.

(57) ABSTRACT

A control device including a means for capturing an image of a display; means for determining from said captured image, information defining a desired position on said display; and means for sending a signal having the determined information. Embodiments of the present disclosure have many applications such as with television to for example select stations or control settings of the televisions, computers, DVDs, videos, MPEG players or the like. Embodiments of the present disclosure can be used with video players or recorders. It should be noted that video player/recorders can deal with video data stored or to be recorded on tape, discs such as DVDs or CDs, removable memory such as a memory stick or a memory internal to the device.

20 Claims, 6 Drawing Sheets

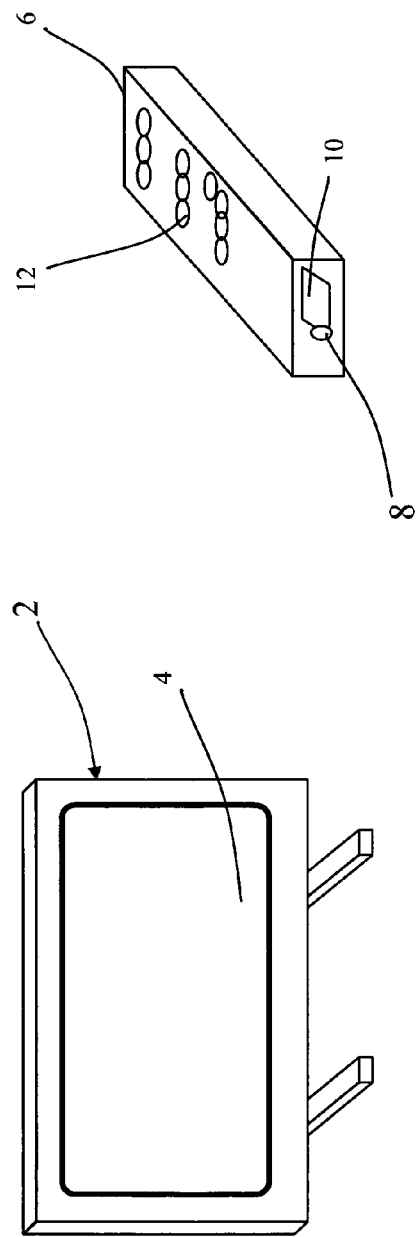
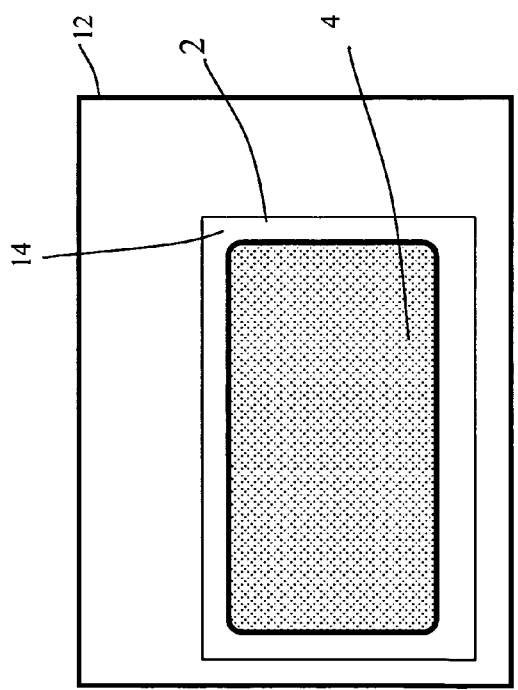

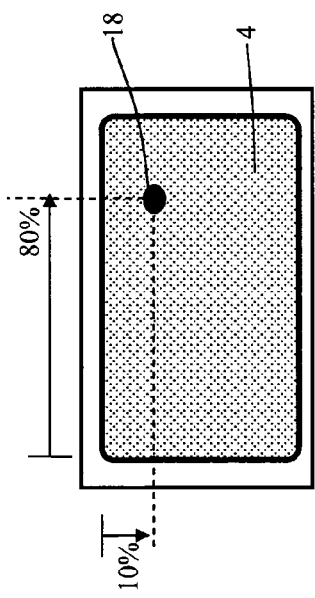
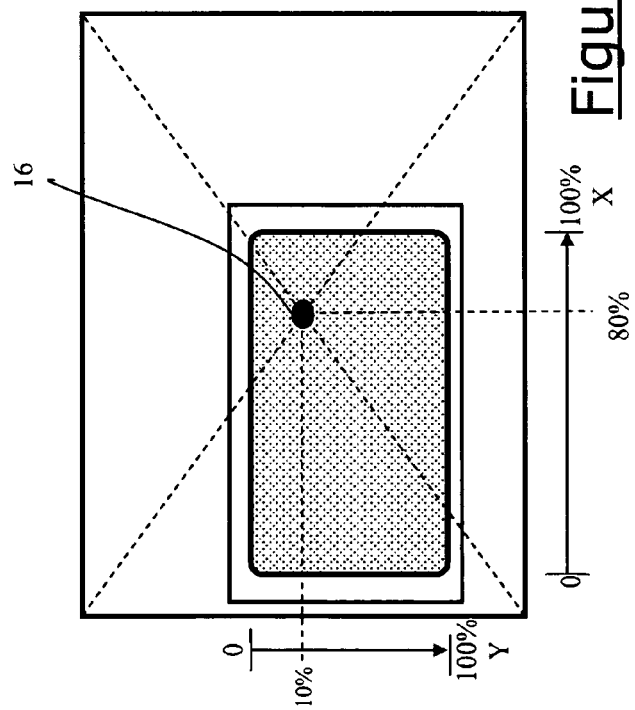
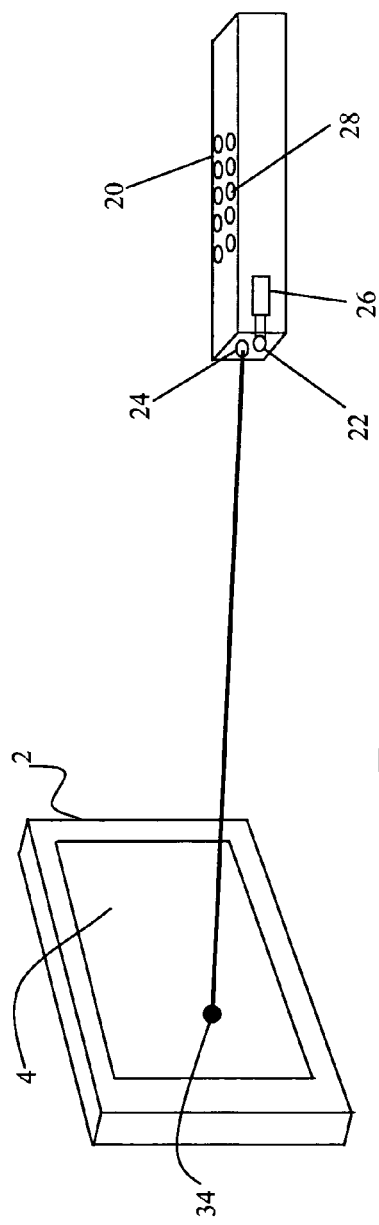

CONTROL DEVICE

CROSS-REFERENCE TO RELATED APPLICATIONS

The present application is related to European Patent Application No. 06253643.8, filed Jul. 12, 2006, entitled "CONTROL DEVICE". European Patent Application No. 06253643.8 is assigned to the assignee of the present application and is hereby incorporated by reference into the present disclosure as if fully set forth herein. The present application hereby claims priority under 35 U.S.C. §119(a) to European Patent Application No. 06253643.8.

TECHNICAL FIELD

The present disclosure relates to a control device and in particular, but not exclusively, to a control device for use with a screen such as a television display.

BACKGROUND

In order to interact with a television display, remote control devices are known. For example, in order to control the playing of a DVD or the like, various options are displayed on the television screen. Using direction (arrow) keys on the remote control a cursor is moved on the screen so that different options on the screen are highlighted. When a desired option is highlighted, then a confirmation button is activated on the remote control. This button can be an enter key or an OK key or any other confirmation key.

Remote controls currently work by detecting the input of the user and converting this into an instruction which is sent via an infrared connection to the device which is controlling the display. The controlling device may be the television itself or a component such as a video or DVD player.

Alternative pointing devices used, for example, with a computer include the mouse. The mouse is connected to a PC via a wired or wireless connection. Movement of the mouse over a surface causes a cursor on the screen to be moved until the cursor is in a desired area. The mouse includes a button or the like which when activated, allows the selection of the option highlighted by the cursor.

With the remote control mechanism described in relation to televisions, many users find difficulties in controlling the cursor, understanding where it is and how to click with it. With the mouse described in relation to computers, this requires a surface on which to move the mouse and also requires some skill in manipulating the mouse so that the desired area is highlighted on the screen and then selected.

SUMMARY

It is an aim of embodiments of the present disclosure to address one or more of the above described problems.

According to one aspect, there is provided a control device comprising: means for capturing an image of a display; means for determining from said captured image, information defining a desired position on said display; and means for sending a signal having the determined information.

Preferably, the capturing means includes a camera. In addition, the determining means is preferably arranged to determine the position of said display in said captured image. The determining means could also be arranged such that the desired position corresponds to a predetermined position relative to the captured image. The predetermined position could include the center of said captured image.

Preferably, the device includes an image forming device for forming an image on said display. The image forming device could include a laser emitter. The desired position may be identified by the position of an image formed by said image forming device. Switching off said image forming device may cause a signal to be sent by said sending means.

Preferably, said determining means is arranged to determine the coordinates of the desired position on said display. In addition, the coordinates could include x and y coordinates.

Preferably, said coordinates are expressed in percentage of dimensions of the display. In addition, said sending means could include a wireless transmitter. The transmitter may be arranged to send a radio frequency signal, a Bluetooth signal or a infrared signal.

Preferably a user input means is provided. The user input means could include a means for inputting a confirmation. The input means could include at least one key. The signal could comprise information relating to said desired position. The control device could be a remote control device, a pointing device, and/or a handheld device.

According to another aspect of the present disclosure, there is provided a control device includes a camera for capturing an image of a display; a processor for determining from the captured image information defining a desired position on the display; and a transmitter for transmitting a signal with said information.

Another aspect of the present disclosure provides a system that could include a control device as defined above in combination with a display. The display could include a TV display or a PC display. The system could include a device for controlling said display. Preferably, said controlling device includes a media player or a PC.

According to another aspect of the present disclosure, there is provided a method including capturing an image of a display; determining from said captured image information defining a desired position on said display; and sending a signal with said information.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 1 shows one embodiment according to the present disclosure having a TV display and a remote control;

FIG. 2 illustrates the principle used in embodiment of the present disclosure;

FIG. 3 illustrates the determination of screen coordinates according to one embodiment of the present disclosure;

FIG. 4 shows how the information of FIG. 3 is used to control the TV display according to one embodiment of the present disclosure;

FIG. 5 shows one embodiment of the present disclosure including a TV display and a remote control;

DETAILED DESCRIPTION

Figure 7:
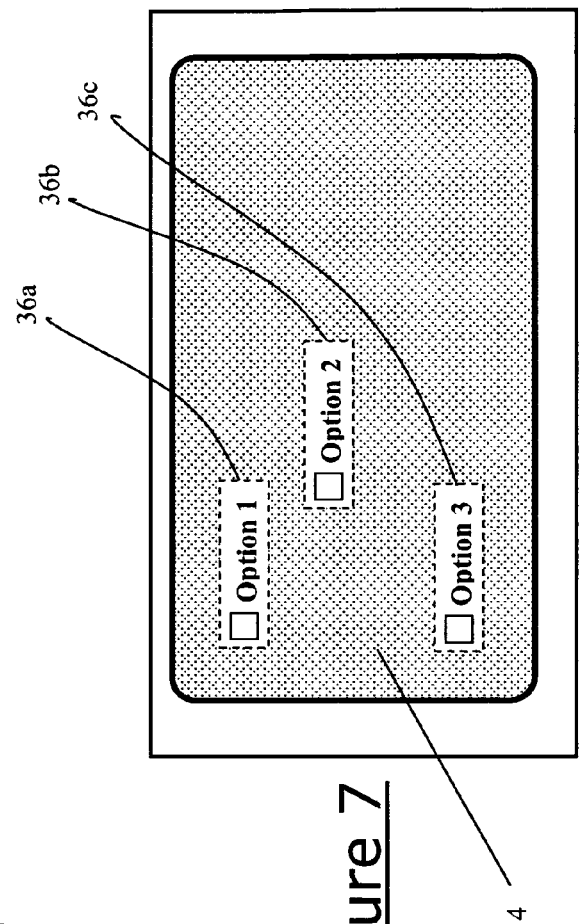
FIG. 7 shows an application according to one embodiment of the present disclosure.

FIG. 1 shows a TV 2 having a display 4. A remote control 6 is provided for controlling the TV display. The remote control includes a camera 8 and image processing circuitry 10. The image processing circuitry 10 can be provided in an integrated circuit, by discrete circuitry or by a combination thereof. The image processor may be implemented in hardware, software or a combination of the two. The remote control 6 has buttons or keys 12.

FIG. 2 shows the camera field of vision 12 of the camera 8. In other words, the camera 8 when pointed in the direction of the TV display, has the camera field of vision 12 which represent the image obtained by the camera. Within that vision field, the camera will see the television 2. The television generally includes a frame area 14 which surrounds the display area 4.

The image processor 10 of the remote control receives the image shown in FIG. 2. The image processor processes the image to identify the display area 4. It does this by identifying the contrast between the display area 4 and the surrounding frame 14.

As illustrated in FIG. 3, the image processor 10 is arranged to determine the screen coordinates of the center of vision 16 of the image captured by the camera. In the scenario shown in FIG. 3, the center of vision 16 can be defined in terms of x and y coordinates in relation to the determined display area 4. The x and y directions are orthogonal. In one embodiment of the present disclosure, the x and y coordinates are determined in terms of the percentages. This has the advantage that the absolute size of the display or screen does not need to be determined. Thus, the center of vision the example shown in FIG. 3 has a position which is 80% x, 10% y. The value of x is between 0 and 100% and the value of y is between 0 and 100%. The value of x from 0 to 100% corresponds to the width of the display area 4 with the value of y form 0 to 100% corresponding to the height of the display area 4.

It should be understood that alternative embodiments of the present disclosure need not use the center of vision as a reference or desired location but may use any other suitable location as a reference point.

The image processor 10 having determined the position on the display area 4 of its center of vision, provides that information to the remote control transmitter, which transmits using, for example, infrared information relating to the position of its center of vision. This position information can be expressed in terms of percentages of x and y, for example x=80%, y=10% as discussed in relation to FIG. 3.

As shown in FIG. 4, a cursor 18 is displayed in the television display 4 at a position which corresponds to 80% of the width of the display area along the x axis and 10% of the height of the display area along the y axis.

The user would then press "Select" or "OK" or "Enter" on the remote control to send a message to the television or device being controlled by the remote control to action the item highlighted by the cursor.

It should be appreciated that the x, y coordinate system used in embodiments of the present disclosure can be replaced by any other suitable way of defining position.

Figure 8:
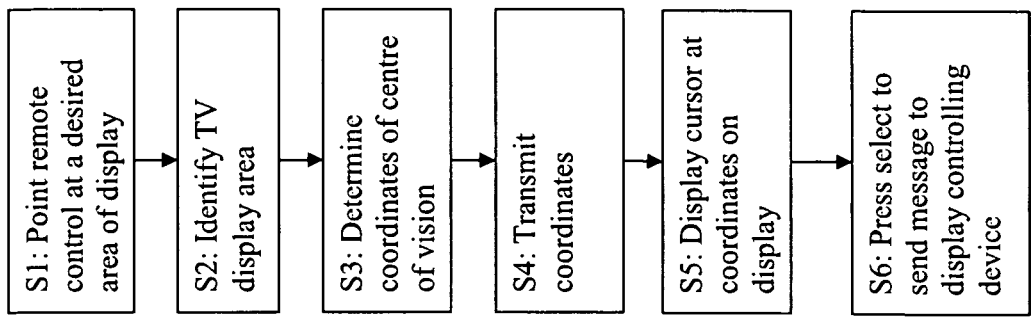
FIG. 8 shows a flow chart of a first method according to one embodiment of the present disclosure.

Reference is now made to FIG. 8 which shows a flowchart of the method steps used in embodiments of the present disclosure.

In step S1, the remote control is pointed at a desired area of the display, with its camera facing the display and an image including the display area is captured by the camera.

In step S2, the TV display area within the field of vision of the camera is identified.

In step S3, the coordinates of the center of vision are determined. This is in terms of the screen coordinates of the desired location, defined by the center of vision, on the display.

In step S4, the coordinates of the position of center of vision is transmitted by the remote control to the device controlling the display.

In step S5, the display displays a cursor at the position identified by the coordinates.

In step S6, a confirmation key on the remote control is pressed or otherwise activated to send a message to the device controlling the display to action the item highlighted by the cursor.

Reference is now made to a second embodiment according to the present disclosure. This embodiment differs from that previously described in that the display does not display a cursor or similar although in some embodiments a cursor may be displayed. Rather, a visible laser beam is provided by the remote control and used as a pointer.

The arrangement shown in FIG. 5 includes a television 2 with a display 4 area. A remote control 20 is provided. The remote control has a camera 22, a laser emitter 24 and image processing circuitry 26. The image processing circuitry 26 can take any of the forms described in relation to the first embodiment. The remote control 20 also has keys or buttons 28.

When the user desires to control the display, a spot of laser light is directed onto the desired option displayed on the television display. This laser emitter can be switched on by activating one of the keys of the remote control or by moving the device, for example by picking up the remote control.

Figure 6:
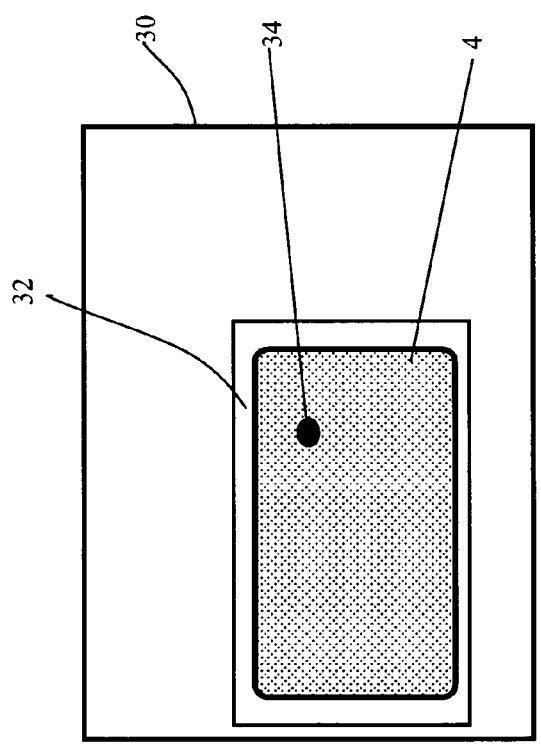
FIG. 6 illustrates the principle used by the embodiment shown in FIG. 5.

FIG. 6 shows the image 30 which is detected by the camera 22. The image processor 26 is arranged to detect the display area 4 of the TV 2 by looking for the area inside the frame 32 of the display area. Alternatively the display area can be detected by virtue of the brightness of the image thereon compared to the surrounding area. Additionally, the image processor 26 is arranged to determine the position of the spot 34 of laser light. In particular, the image processor 26 is arranged to determine the position of the spot 34 on the display area. This is done in a similar way as described in relation to the previous embodiment but instead uses the position of the spot of laser light rather than the center of vision. In particular, the position of the laser spot 34 with respect to the display area is determined in terms of percentage coordinates, for example 80% x, 10% y as described previously.

The image processor 26 has thus calculated the screen coordinates of the laser spots. When the "OK" or "Enter" button is activated or pressed, the screen relative coordinates are transmitted to the device controlling the display. From this, it is determined which of the options is highlighted by the laser spot and that option is selected by the device controlling the display.

Figure 9:
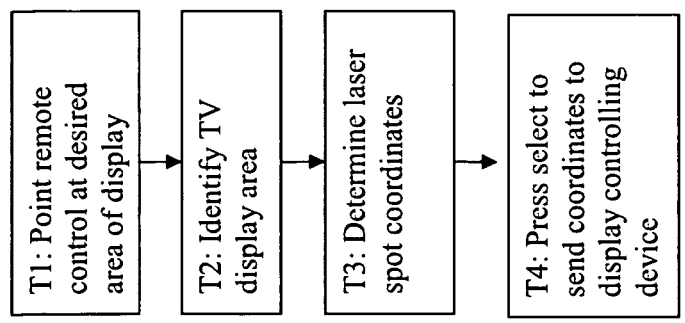
FIG. 9 shows a flow chart of a second method according to one embodiment of the present disclosure.

The method embodying the second described embodiment is shown in FIG. 9. In step T1, the remote control is pointed at a desired area of the display, with a laser spot at the desired area on the display, the laser spot being activated via the remote control and an image including the display is captured by the camera.

In step T2, the image processor of the remote control identifies the display area in the captured image.

In step T3, the coordinates of the laser spot on the display area are determined.

The "OK" or "Enter" option is selected by the user interacting with the remote control in step T4 and the screen relative coordinates are transmitted to the device by the remote control using a transmitter such an infra red transmitter.

Reference is made to FIG. 7 which shows the TV display 4. On the display 4 are various options 36a, 36b and 36c. Using, for example either of the methods described previously, one of these options is selected either by pointing the laser beam at the selected option or by centering the image captured by the camera on the selected option. Once an option has been selected, the display is controlled in accordance with the selected option.

Thus, the camera with the associated software recognises a TV or computer screen roughly centrally in its field of vision. Typically the TV screen is a bright rectangular image with a hard edge. The laser spot is bright and can be easily registered by the camera software within the rectangle of the screen and its coordinates determined. In embodiments of the present disclosure, the laser would not operate unless the device recognises the screen. The changing coordinates and the click can be transmitted to the remotely controlled system in the normal way by infrared etc. Embodiments of the present disclosure have the advantage that interaction with computers and TVs can be achieved in an intuitive way, particularly the navigation of menu systems and consumer TV products.

In one embodiment of the present disclosure, switching off of the laser may be sufficient to activate the option associated with the highlighted area. Thus, embodiments of the present disclosure provide a handheld device with a forward pointing optical laser and camera. The laser dot illuminates the active screen areas, in a similar way to a mouse cursor and switching off the laser can activate the area. Other methods could be used in a normal way (i.e., when the laser spot is over a hot spot a submenu can open).

Figure 10:
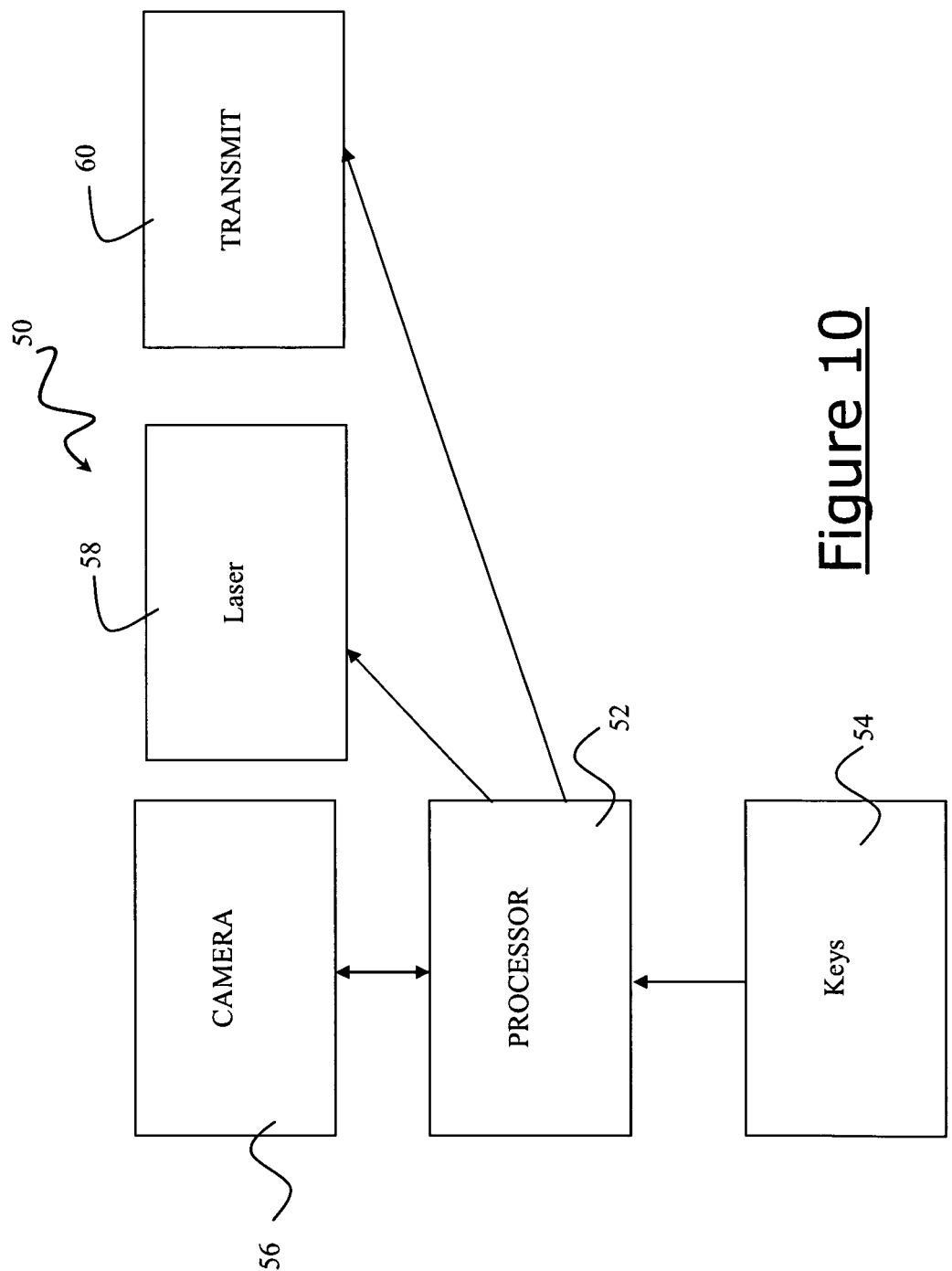
FIG. 10 shows the components of a remote control according to one embodiment of the present disclosure.

Reference is made to FIG. 10 which schematically shows a remote control embodying the present disclosure. The remote control 50 has a processor 52. This processor is arranged to receive input information received from keys 54. The processor is arranged activate the camera 56 in response to an input from the keys 54. The activation of any key 54 may be sufficient to activate the camera and cause it to capture image. Alternatively, a particular key may be activated in order to cause the camera to operate.

Image data captured by the camera 56 is passed to the processor 52 for processing.

Also provided is a laser generating circuit 58. This is controlled by the processor 52 in response to the activation of a particular key 54. In one embodiment of the present disclosure, the activation of a particular key causes the laser circuitry 58 to be activated to provide a pointing beam and at the same time activates the camera 56. In alternative embodiments of the present disclosure, the laser generating circuit 58 may be activated in response to activation of any of the keys 54.

The remote control includes transmit circuitry 60. The transmit circuitry 60 is controlled by the processor 52 to transmit information to the device controlling the display.

In one embodiment of the present disclosure, the control device is used to control a PC, for example for a presentation. The device may be connected directly to the PC via a connection such a wireless connection. One example of a wireless connection is a Bluetooth® connection.

Embodiments of the present disclosure could emulate at least some of the functions of a mouse or the like.

In one embodiment of the present disclosure, there is provided a companion device. This companion device is connected to a PC. For example the connection may be via a wireless interface, a USB port or the like. This companion device is arranged to connect to the software drivers to thereby provide an interface between the PC and the remote control.

It should be appreciated that embodiments of the present disclosure can be used to control a television display, a computer screen, a video screen or any other suitable display device. Embodiments of the present disclosure can be used to control any device which is connected to the display in accordance with the options displayed and selected via the display using a device embodying the present disclosure.

Embodiments of the present disclosure may interact with the display to control the equipment driving the display.

It should be appreciated that various aspects of the first and second embodiments may be combined in further embodiments of the present disclosure.

In one option, the remote control may have a display which is able to display the image captured by the camera. That display may have marked on a particular point. The remote control could then be moved until the desired area to be selected on the screen is coincident with the marked point on the display. This marked point may be on the center of the display but may not necessarily be so.

Preferred embodiments of the present disclosure have used infrared to transmit commands between the remote control and the device controlling the display. It should be appreciated that in alternative embodiments of the present disclosure, any other suitable wireless communication may be provided. That wireless communication could for example be a Bluetooth connection or any suitable radio frequency connection.

It should be appreciated that in some embodiments of the present disclosure the connection between the remote control and the device controlling the display may be via a wire connection.

It should be appreciated that in preferred embodiments of the present disclosure, there is a direct connection between the remote control and the device controlling the display. However, it should be appreciated that embodiments of the present disclosure are such that the remote control may communicate via an intermediate entity which in turn communicates with the device controlling the display.

It should be emphasised that embodiments of the present disclosure are applicable to controlling the position of a cursor or the like on a display.

In some embodiments of the present disclosure, cursors are used. However, it should be appreciated that there are various other different ways in which a particular option can be highlighted, for example using colour and/or flashing images or the like. Embodiments of the present disclosure can be applied in such situations.

Embodiments of the present disclosure have been described in the context of the remote control having buttons. It should be appreciated that in one alternative, the remote control may omit all buttons other than a single activation element. This activation element can take the form of a button, a key, a touchpad or the like.

The user interface provided on the remote control can of course take alternative form to the keys and buttons shown in the illustrated embodiments. For example, touch-screen, touch-pads, joysticks, wheels, sliders or the like may be used in embodiments of the present disclosure.

Embodiments of the present disclosure have many applications such as with television to for example select stations or control settings of the televisions, computers, DVDs, videos, MPEG players or the like. Embodiments of the present disclosure can be used with video players or recorders. It should be noted that video player/recorders can deal with video data stored or to be recorded on tape, discs such as DVDs or CDs, removable memory such as a memory stick or a memory internal to the device.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A control device comprising:
   a capturing circuit adapted to capture an image of a display;
   a determining circuit adapted to determine from the captured image information defining a desired position on the display; and
   a sending circuit adapted to send a signal having the determined information.

2. The device according to claim 1, wherein the capturing circuit comprises a camera.

3. The device according to claim 1, wherein the determining circuit is adapted to determine a position of the display in the captured image.

4. The device according to claim 1, wherein the device comprises an image forming device adapted to form an image on the display.

5. The device according to claim 4, wherein the desired position is identified by a position of the image formed by the image forming device.

6. The device according to claim 4, wherein switching off the image forming device causes the signal to be sent by the sending circuit.

7. The device according to claim 1, wherein the determining circuit is adapted to determine coordinates of the desired position on the display.

8. The device according to claim 1, wherein the sending circuit comprises a wireless transmitter.

9. The device according to claim 1 further comprising:
   a user input device.

10. The device according to claim 1, wherein the signal comprises information relating to the desired position.

11. The device according to claim 1, wherein the control device is at least one of: a remote control device, a pointing device, and a handheld device.

12. A system comprising the control device according to claim 1, in combination with at least one of:
   a video player;
   a video recorder;
   a video player and recorder;
   a DVD or disk player;
   a DVD or disk recorder;
   a DVD or disk player and recorder;
   an MPEG player;
   an MPEG recorder;
   an MPEG player and recorder;
   an audio player;
   an audio recorder;
   an audio/video player;
   an audio/video recorder;
   an audio/video player and recorder;
   a PC;
   a television; and
   a display.

13. The device according to claim 12, wherein the display comprises at least one of: a TV display, a video display and a PC display.

14. The device according to claim 1 further comprising:
   a device for controlling the display.

15. The device according to claim 14, wherein the controlling device comprises at least one of: a media player and a PC.

16. A method comprising:
   capturing an image of a display;
   determining from the captured image information defining a desired position on the display; and
   sending a signal having the determined information.

17. The method according to claim 16 further comprising:
   determining a position of the display in the captured image.

18. The method according to claim 16 further comprising:
   forming an image on the display.

19. The method according to claim 18 further comprising:
   identifying the desired position by a position of an image formed by the image forming device.

20. A remote control device adapted to control at least one of: a video player and/or recorder; DVD or disk player and/or recorder; MPEG player and/or recorder; audio player or recorder; audio/video player and recorder; PC; television; and display, the device comprising:
   a capturing circuit adapted to capture an image of a display;
   a determining circuit adapted to determine from the captured image information defining a desired position on the display; and
   a sending circuit adapted to send a signal having the determined information.

* * * * *